US009864694B2

(12) United States Patent
Dooley et al.

(10) Patent No.: US 9,864,694 B2
(45) Date of Patent: Jan. 9, 2018

(54) TRACKING THE CONTENT OF A CACHE USING A WAY TRACKER HAVING ENTRIES WITH A CACHE MISS INDICATOR

(71) Applicant: ARM LIMITED, Cambridge (GB)

(72) Inventors: Miles Robert Dooley, Austin, TX (US); Todd Rafacz, Austin, TX (US); Guy Larri, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 14/702,972

(22) Filed: May 4, 2015

(65) Prior Publication Data

US 2016/0328320 A1    Nov. 10, 2016

(51) Int. Cl.
*G06F 12/00* (2006.01)
*G06F 12/0895* (2016.01)
*G06F 12/0864* (2016.01)
*G06F 12/1027* (2016.01)

(52) U.S. Cl.
CPC ...... *G06F 12/0895* (2013.01); *G06F 12/0864* (2013.01); *G06F 12/1027* (2013.01); *Y02B 60/1225* (2013.01)

(58) Field of Classification Search
CPC ................. G06F 12/084; G06F 2212/6042
See application file for complete search history.

(56) References Cited

U.S. PATENT DOCUMENTS 6,247,094 B1    6/2001    Kumar et al.
6,321,297 B1    11/2001    Shamanna et al.

| | | | |
|---|---|---|---|
| 2004/0199723 A1* | 10/2004 | Shelor | G06F 12/0864 711/128 |
| 2008/0010566 A1* | 1/2008 | Chang | G06F 11/1024 714/718 |
| 2009/0157982 A1* | 6/2009 | MacInnis | G06F 12/0875 711/145 |

(Continued)

FOREIGN PATENT DOCUMENTS

WO    99/31593    6/1999
WO    2013/167886    11/2013

OTHER PUBLICATIONS

UK Combined Search and Examination Report dated Sep. 1, 2016 in GB 1605049.4, 7 pages.

(Continued)

*Primary Examiner* — Larry T Mackall
(74) *Attorney, Agent, or Firm* — Nixon & Vanderhye P.C.

(57) ABSTRACT

A cache is provided comprising a plurality of ways, each way of the plurality of ways comprising a data array, wherein a data item stored by the cache is stored in the data array of one of the plurality of ways. A way tracker of the cache has a plurality of entries, each entry of the plurality of entries for storing a data item identifier and for storing, in association with the data item identifier, an indication of a selected way of the plurality of ways to indicate that a data item identified by the data item identifier is stored in the selected way. Each entry of the way tracker is further for storing a miss indicator in association with the data item identifier, wherein the miss indicator is set by the cache when a lookup for a data item identified by that data item identifier has resulted in a cache miss. A corresponding method of caching data is also provided.

11 Claims, 4 Drawing Sheets

(56) References Cited

U.S. PATENT DOCUMENTS

2011/0072215 A1 3/2011 Takahashi
2013/0304991 A1* 11/2013 Bottcher ............. G06F 12/0864
                                                            711/122
2014/0136796 A1* 5/2014 Miura ................. G06F 12/0888
                                                            711/140

OTHER PUBLICATIONS

J. Dai et al, "Exploiting Early Tag Access for Reducing L1 Data Cache Energy in Embedded Processors" *IEEE Transactions on Very Large Scale Integration* (VLSI) *Systems*, vol. 22, No. 2, Feb. 2014, pp. 396-407.

J. Kang et al, "Way-tracking set-associative caches" *Electronic Letters*, Oct. 28, 2010, vol. 46, No. 22, 2 pages.

* cited by examiner

TRACKING THE CONTENT OF A CACHE USING A WAY TRACKER HAVING ENTRIES WITH A CACHE MISS INDICATOR

BACKGROUND

The present disclosure relates to data processing. More particularly, it relates to caching data for data processing.

A cache may be provided in a data processing apparatus in order to store local copies of data items which are stored in memory, such that When those data items are frequently accessed by the data processing apparatus the latency associated with retrieving those data items from memoir need not be incurred for each access.

Caches may be provided in a number of cache levels, wherein the cache levels and the memory in which the data items are stored form a hierarchy, with smaller, faster caches being provided closer to the processing element of the data processing apparatus and larger, slower caches being provided closer to the memory.

Caches may be arranged in a set-associative manner, wherein multiple ways are provided in which data items can be stored. The storage location of a given data item in the cache is usually determined by a portion of the memory address of that data item, but the multiple ways provide a corresponding number of possible storage locations for the data item. This mitigates against problems associated with two data items, which are both frequently accessed by the data processing apparatus, having the same memory address portion and therefore the same storage location in the cache. If there were only one possible storage location for these two data items in the cache, then accessing one would evict the other. and the frequent access made to both would result in "thrashing".

The speed and efficiency of operation of a cache are important factors in the implementation of a cache in a data processing apparatus and there remains the opportunity for improvement in both these characteristics.

SUMMARY

At least some embodiments have a cache comprising:
a plurality of ways, each way of the plurality of ways comprising a data array, wherein a data item stored by the cache is stored in the data array of one of the plurality of ways; and
a way tracker comprising a plurality of entries, each entry of the plurality of entries for storing a data item identifier and for storing, in association with the data item identifier, an indication of a selected way of the plurality of ways to indicate that a data item identified by the data item identifier is stored in the selected way,
wherein each entry is further for storing a miss indicator in association with the data item identifier, wherein the miss indicator is set by the cache when a lookup for a data item identified by that data item identifier has resulted in a cache miss.

At least some embodiments provide al Method of caching data items is provided comprising:
storing a data item in a data array of a way of a plurality of ways of a cache; storing a data item identifier in an entry of a way tracker comprising a plurality of entries;
storing, in association with the data item identifier in the entry of the way tracker, an indication of a selected way of the plurality of ways to indicate that a data item identified by the data item identifier is stored in the selected way;
storing a miss indicator in association with each data item identifier stored in the way tracker; and
setting the miss indicator when a lookup for a data item identified by that data item identifier has resulted in a cache miss.

At least some embodiments have a cache comprising:
means for storing a data item in a data array of a way of a plurality of ways of a cache;
means for storing data item identifier in an entry of a way tracker comprising a plurality of entries;
means for storing, in association with the data item identifier in the entry of the way tracker, an indication of a selected way of the plurality of ways to indicate that a data item identified by the data item identifier is stored in the selected way;
means for storing a miss indicator in association with each data item identifier stored in the way tracker; and
means for setting the miss indicator when a lookup for a data item identified by that data item identifier has resulted in a cache miss.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
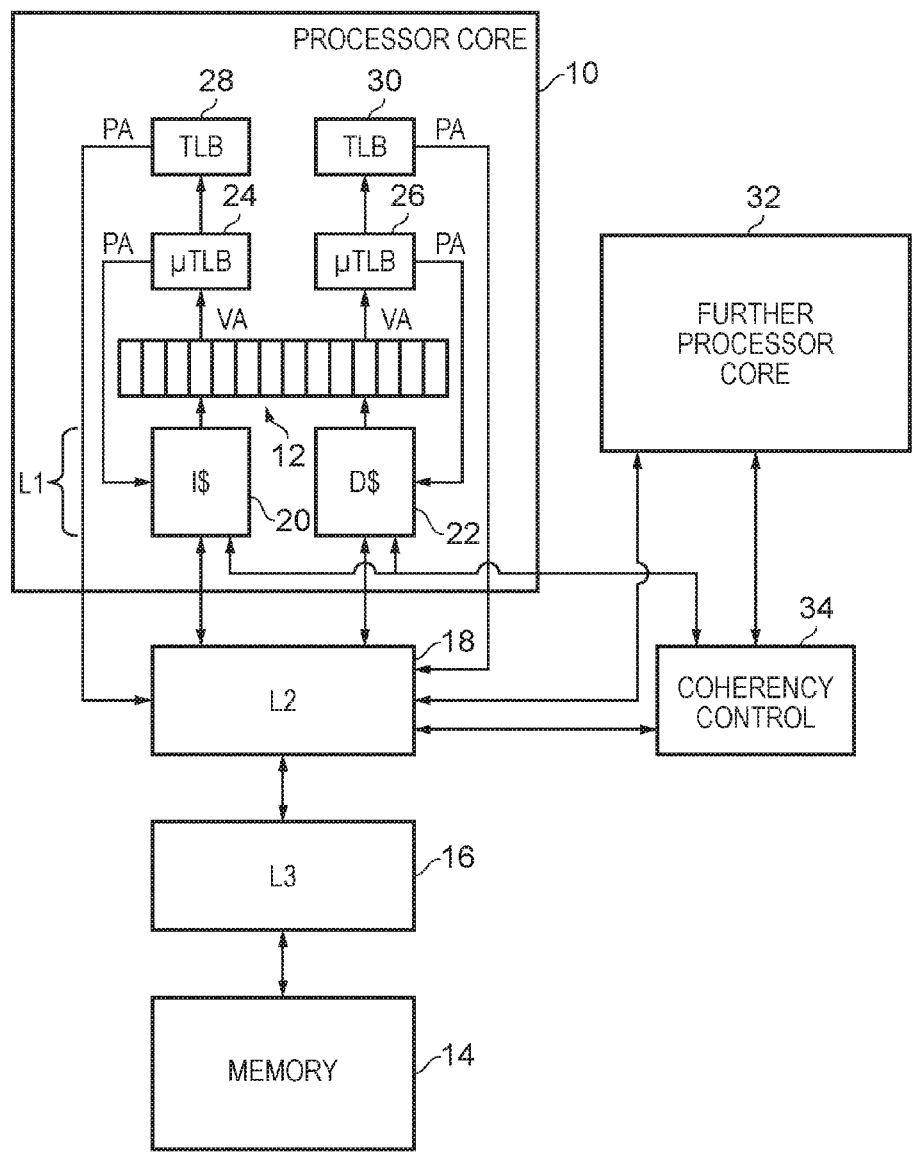
FIG. 1 schematically illustrates a data processing apparatus comprising a cache in one embodiment.

At least some embodiments of a cache according to the present techniques comprise: a plurality of ways, each way of the plurality of ways comprising a data array, wherein a data item stored by the cache is stored in the data array of one of the plurality of ways; and a way tracker comprising a plurality of entries, each entry of the plurality of entries for storing a data item identifier and for storing, in association with the data item identifier, an indication of a selected way of the plurality of ways to indicate that a data item identified by the data item identifier is stored in the selected way, wherein each entry is further for storing a miss indicator in association with the data item identifier, wherein the amiss indicator is set by the cache when a look up for a data item identified by that data item identifier has resulted in a cache miss.

The cache has multiple ways, i.e. it is set-associative, in that a given data item stored in the cache can be stored in one of several possible storage locations in the cache, wherein the number of possible storage locations is given by the number of ways in the cache. Given that there are multiple possible storage locations for a data item in the cache, a way tracker is provided in order to give an early indication of the way of the cache in which a particular data item (identified by its data item identifier, for example its memory address or a portion of its memory address) is stored, this for example enabling a full lookup procedure in the cache to be avoided. Additionally, each entry of the way tracker is arranged also to be able to store a miss indicator, this miss indicator being set following a lookup for the corresponding data item missing in the cache, in other words if it is known that the corresponding data item is not stored in the cache. As such the present techniques enable the cache to benefit from storing information relating to "known cache misses" in the cache, without needing to provide additional dedicated components to do so, since this functionality is provided by making use of an existing way tracker and extending the information stored in each entry of the way tracker (which otherwise stores indications of where data items are stored in the cache) to include an indication of a known cache miss for a data item.

In some embodiments the cache further comprises: at least one tag array having a plurality of tag entries for storing data item identifiers, the at least one tag array for storing a data item identifier in a tag entry of the at least one tag array corresponding to a storage location of a data item in the data array of one of the plurality of ways; and access circuitry for performing a lookup procedure in the at least one tag array and in the data array of each of the plurality of ways in response to reception of a received data item identifier, wherein the way tracker is responsive to a match between the received data item identifier and the data item identifier in an entry of the way tracker to cause suppression of the lookup procedure by the access circuitry in the at least one tag array. Hence, where at least one tag array is provided to enable the cache to perform a lookup to determine a storage location (way) of a given data item in the cache, time and energy expenditure by the cache may be saved by suppressing the lookup procedure in the at least one tag array when there is a match in the way tracker, since whether the entry in the way tracker indicates that the data item is stored in a particular way of the cache (and therefore the tag array lookup to determine that way is unnecessary) or the entry in the way tracker indicates that the data item is a "known cache miss" (and therefore the tag array lookup is unnecessary because the data item is not to be found in the cache). From one point of view the way tracker can be seen as in effect a small subset of the tag array, and the fact that it is smaller than enables it to be accessed faster (and thus in time to suppress an actual tag array access when a match is found).

In some embodiments, the way tracker is responsive to the match between the received data, item identifier and the data item identifier in the entry of the way tracker, and when the indication of the selected way is stored in that entry, to cause suppression of access by the access circuitry to the data array of each of the plurality of ways other than the selected way. Accordingly, where the entry in the way tracker indicates the way in which the requested data item (as identified by the received data item identifier) is known to be stored, the access to the data arrays can be partially avoided, in that the access need only be performed in the way in which it is known that the data item is stored. The energy expenditure of performing the access in other ways is thus saved.

In some embodiments, the way tracker is responsive to the match between the received data item identifier and the data item identifier in the entry of the way tracker, and when the miss indicator is stored in association with that data item identifier, to cause suppression of the access by the access circuitry to the data array of all of the plurality of ways. Where it is known that the data item is not stored in the cache (because the miss indicator is set and stored in association with the corresponding data item identifier), by suppressing the access in all data arrays, the energy expenditure associated with accessing the data arrays can be saved.

In some embodiments the indication of the selected way stored in the way tracker comprises a disable indicator for each of the plurality of ways, and the access circuitry is responsive to the match between the received data item identifier and the data item identifier in the entry in the way tracker to disable access to the data array of a way of the cache when the disable indicator for that way in the entry of the way tracker is set, The indication of the selected way may be stored in a variety of ways, for example, it could be an explicit reference to a particular way, but in these embodiments in which a disable indicator for each way is provided, the disable indicator can be used to disable access to a corresponding data array (i.e. no access is performed in that data array).

In some embodiments storage of the miss indicator in the way tracker comprises setting all of the disable indicators for all of the plurality of ways. Thus by setting all available disable indicators (i.e. for all ways) it is ensured that for a. known cache miss no access to the ways of the cache will be performed.

In some embodiments the cache forms part of a memory hierarchy and the cache is a level one cache. A level one cache will generally have the strictest requirements in the memory hierarchy with regard to speed of response (i.e. the fastest response time requirement), yet will also often have the least area available (in terms of its provision in an integrated circuit) due to its required proximity to the processing element of the data processing apparatus (e.g. a processor core). Thus the ability of the present techniques to store both indications of the way in which a given data item is stored in the cache and indications of known cache misses may be of particular applicability in a level one cache. Moreover, the typical data access patterns at a level one cache can make the present techniques of particular use. Specifically, multiple cache miss requests may be filtered out by the time the requests get to a level two (or lower) cache, but this isn't typically the case at the lowest level (L1) cache, which could see lookups from multiple different instructions, which all need the same cache line, and for which there is already an outstanding miss request, but it's not typically known soon enough to suppress the L1 cache lookup).

In some embodiments the way tracker is further for receiving storage attribute information associated with a requested data item to which access is sought, and the way tracker is arranged to suppress creation of an entry in the way tracker with the miss indicator set for the requested data item, when the storage attribute information indicates that the requested data item is non-cacheable. The non-cacheability of a data item may be one reason why a lookup for the data item in the cache results in a cache miss, and accordingly if the information is available that a requested data item is non-cacheable, then suppressing creation of an entry in a way tracker with the miss indicator set can leave entries of the way tracker available for other data items which are cacheable and therefore for which the benefit of storing associated information in the way tracker of the present techniques may be gained.

In some embodiments the storage attribute information is received from a translation lookaside buffer. Storage attribute information may be received from a number of sources, although will typically be information ultimately stored in a page table for a given memory location, and this being the case the information may be received from a translation lookaside buffer (TLB) which is provided in association with the processing element seeking access to a data item at that memory location to provide faster access to such attribute information. Indeed a translation lookaside buffer itself is a variety of cache, to which the present techniques may be applied.

In some embodiments the data item identifier is at least a portion of a memory address for the data item. The data item identifier may take a variety of forms, but may comprise the entire memory address of the data item, or a portion of the memory address, so long as that portion is sufficient to uniquely identify the data item.

In some embodiments each entry of the way tracker further comprises a data. item identifier extender, wherein the way tracker is responsive to the data item identifier extender being set to ignore a predetermined identifier portion when determining whether there is a match between a received data item identifier and the data item identifier in an entry in the way tracker. This data item identifier extender thus enables, for example, a range of received data item identifiers to be found to match against a given data item identifier stored in an entry of the way tracker. Thus without having to store additional data item identifiers in entries of the way tracker, any received data item identifier (e.g. memory address) which falls within that range can then be found to match and the above described techniques for responding to that match can be implemented.

In some embodiments the predetermined identifier portion comprises a least significant portion of the data item identifier. The portion which is ignored in order to find the match may take a variety of forms, but ignoring a least significant portion of the data item identifier enables a contiguous range of memory addresses (e.g. two consecutive memory addresses) to be matched against one data item identifier in an entry of the way tracker. The nature of the data processing instructions being executed may be such that some consecutive memory addresses are accessed in rapid succession, leading to particular applicability of such embodiments.

At least some embodiments provide a method of caching data items comprising: storing a data item in a data array of a way of a plurality of ways of a cache; storing a data item identifier in an entry of a way tracker comprising a plurality of entries; storing, in association with the data item identifier in the entry of the way tracker, an indication of a selected way of the plurality of ways to indicate that a data item identified by the data item identifier is stored in the selected way; storing a miss indicator in association with each data item identifier stored in the way tracker; and setting the miss indicator when a lookup for a data item identified by that data item identifier has resulted in a cache miss.

At least some embodiments provide a cache comprising: means for storing a data item in a data array of a way of a plurality of ways of a cache; means for storing a data item identifier in an entry of a way tracker comprising a plurality of entries; means for storing, in association with the data item identifier in the entry of the way tracker, an indication of a selected way of the plurality of ways to indicate that a data item identified by the data item identifier is stored in the selected way; means for storing a miss indicator in association with each data item identifier stored in the way tracker; and means for setting the miss indicator when a lookup for a data item identified by that data item identifier has resulted in a cache miss.

FIG. 1 schematically illustrates a data processing apparatus in one embodiment. The data processing apparatus comprises a processor core 10. The processor core 10 has an execution pipeline 12, by means of which the processor core 10 performs data processing operations. In performing these data processing operations, the processor core 10 retrieves data items from a memory 14 where they are stored. It should be noted that here "data items" refers to both instructions and data values which are the subject of processing in accordance with the instructions. The memory 14 forms part of a memory hierarchy, further consisting of a level 3 (L3) cache 16, a level 2 (L2) cache 18 and two level one (L1) caches 20 and 22, where L1 cache 20 is a dedicated instruction cache and L1 cache 22 is a dedicated data cache. The provision of these three levels of caches between execution pipeline 12 and the memory 14 enables the processor core 10 to avoid the latency associated with retrieving frequently data items from memory 14 each time those data items are accessed, in a manner with which one of ordinary skill in the art will be familiar and is not described further here for brevity.

When seeking access to a given data item, the execution pipeline specifies this data item by means of a virtual address, which must he translated into a physical address for use in the cache hierarchy and memory. Translations between virtual addresses used by the execution pipeline and physical addresses used in the caches and memory are given in a page table stored in memory 14, but to enable faster translation of virtual addresses into physical addresses, these translations are also cached, the μTLBs 24 and 26 and the TLBs 28 and 30 forming their own translation hierarchy, wherein the TLB is a backing cache for the μTLB, and both may be used to satisfy a request to the L1 cache, e.g. if an L1 cache request misses in the μTLB, the MMU (of which these (μ)TLBs form part) then checks in the TLB in order to satisfy the L1 cache lookup.

The data processing apparatus further comprises another (further) processor core 32 which shares access to the memory 14 via the L2 cache 18 and the L3 cache 16. Internally, the further processor core 32 may be configured in a similar manner to the processor core 10. Because of the shared access to data items in the cache hierarchy and memory 14, coherency control 34 is also provided, which monitors accesses made to data items by the processor core 10 and the further processor core 32 and ensures that a suitable coherency protocol is followed, such that collisions do not occur because both processor cores accessing and modifying the same data items. Detail of the implementation of such coherency protocols are also known to one of ordinary skill in the art and are not given here for brevity.

Figure 2:
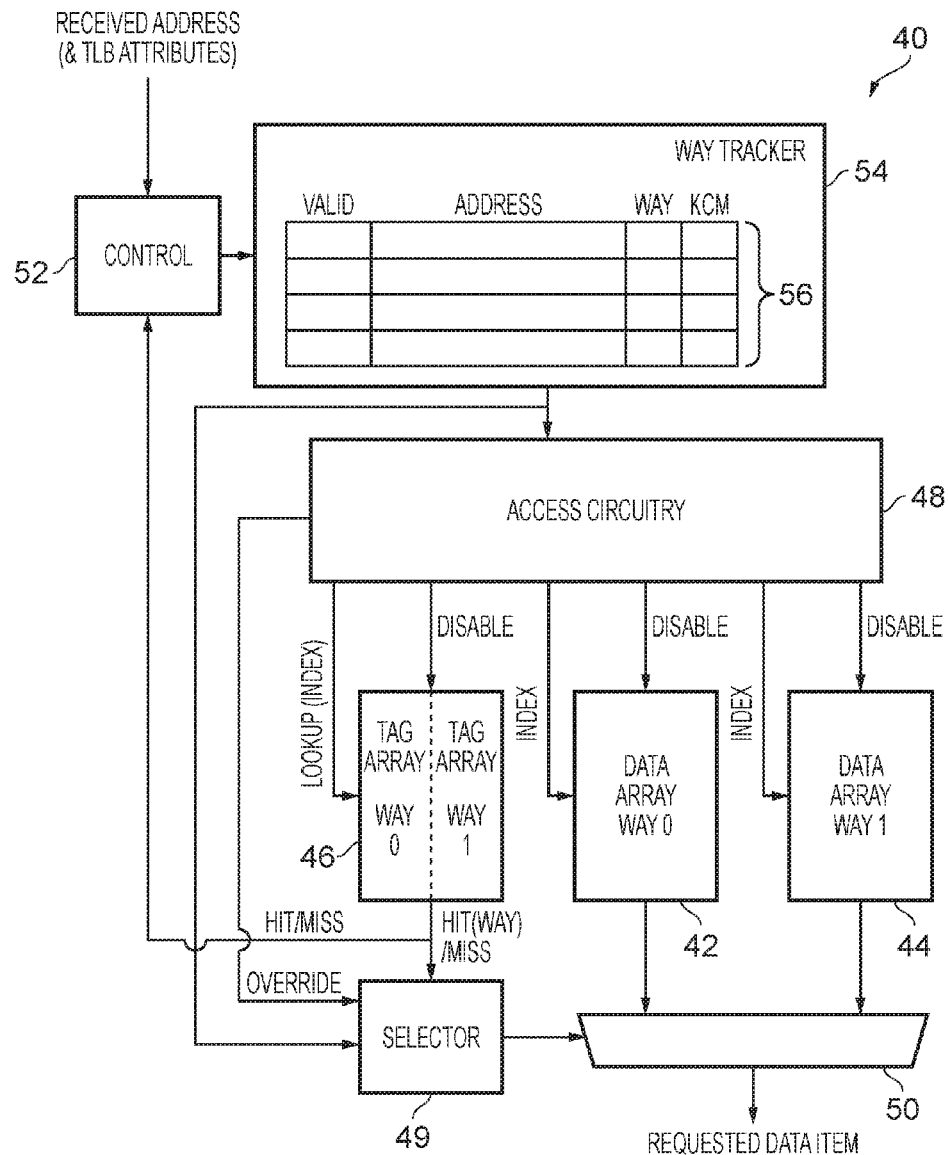
FIG. 2 schematically illustrates in more detail a cache in one embodiment.

FIG. 2 schematically illustrates more detail the configuration of a cache according to the present techniques in one embodiment, such as may for example be implemented in the L1 caches 20 and 22 shown in FIG. 1. The cache 40 is a set-associative cache, wherein a given data item (specified by its memory address) may be stored in multiple locations in the cache, namely in one of the multiple ways of the cache. For simplicity of illustration, the cache 40 shown in FIG. 2 only has two ways, but the present techniques are not limited to a particular number of ways and other embodiments having caches with, for example, four or eight ways (and so on) are also contemplated. Accordingly, referring to FIG. 2, a given data item stored in cache 40 is stored either in data array 42 of way 0 or data array 44 of way 1. A tag array 46 is also provided in association with the data arrays 42 and 44, in which a tag portion of the memory address of a data item stored in one of the data arrays is stored, in order to enable the cache to perform a lookup procedure to determine if a requested data item (specified by its memory address) is stored in the cache. The tag array 46 is in fact sub-divided into two parts, a first tag array corresponding to way 0 and a second tag array corresponding to way 1.

Access circuitry 48 of the cache 40 is configured to form a lookup procedure in the tag arrays 46 and to access the data arrays 42 and 44 on the basis of a received memory address. One of ordinary skill in the art will be familiar with this feature of a set associative cache, and further detail of the lookup procedure is not given here. However, in essence the lookup and access procedure comprises the access circuitry 48 using an index portion of the memory address to select a given set of entries in the: tag arrays 46 and the data. arrays 42 and 44, wherein if the tag portion of the memory address matches the tag portion stored in either the tag array for way 0 or the tag array for way 1, then a cache "hit" has been found, namely that the requested data item is then known to be stored in the corresponding data array (i.e. 42 or 44).

The same index is also used to read out the corresponding entries of the data array 42 and the data array 44 in parallel with the lookup procedure being carried out in tag arrays 46, in order to avoid delays associated with sequential referencing and access of the tag arrays and then the data arrays. A hit resulting from the lookup in the tag arrays 46 is signalled to the selector 49 which then steers the multiplexor 50 accordingly in order that the requested data item is then output. If a cache miss results from the lookup procedure (i.e. the tag portion of the received address does not match the tag portions stored in the indexed entry of either tag array), then the selector 49 prevents either of the data items read out from data array 42 or 44 from being output. Whether a cache hit or a cache miss has occurred, the result of the lookup procedure is also signalled to the control unit 52 which maintains overall control of the cache 40 and can for example signal to the next level of the cache hierarchy when a cache miss occurs in order for the requested data item either to be retrieved from that next level of the cache hierarchy, or for the request to be passed still further.

According to the present techniques, the cache 40 is also provided with a way tracker 54, which in the example embodiment illustrated in FIG. 2 has four entries 56. For the purposes of the present disclosure, each of these entries 56 is illustrated as being arranged to store address information which is sufficient to uniquely identify a data item stored in the cache, as well as validity information, way information and "known cache miss" information. In addition the way tracker stores some additional cache state information (not explicitly illustrated here) that would otherwise come from the tag array, in order to enable the tag array access to be skipped entirely. The validity information, for example a single bit indicating Whether the corresponding entry is valid or not, is provided for ease of administration of the entries 56 in the way tracker 54. The way information is used by the way tracker 54 to store an indication of where the corresponding data item (specified by its memory address) is known to be stored in the cache, specifically in which way of the cache that data item is stored. Thus, when a memory address is received by the cache 40, the control unit 52 causes a check to be made with reference to the entries of the way tracker 54 to determine if there is a corresponding (valid) address stored in an entry 56 of the way tracker 54, and if so, which way of the cache that data item is indicated as being stored in. On the basis of this information, the way tracker 54 signals to the access circuitry 58 that a valid address match has been found and as a result the access circuitry 48 suppresses the lookup in the tag arrays 46 (since it is known in which way 42 or 44 the requested data item is stored and therefore the time and energy expenditure of performing the lookup procedure in the tag arrays 46 can be saved). Additionally, the access circuitry 48 causes all other ways than the way indicated by the corresponding entry 56 of the way tracker 54 to be disabled, such that only the data array in which the requested data item is known to be stored is accessed and from which the data item is read out. An override signal from the access circuitry 48 to the selector 49 enables the selector 49 to cause the multiplexor 50 to output the appropriate data item.

The entries 56 of the way tracker 54 additionally comprise the "known cache miss" (KCM) information. This indication, which in this embodiment can be provided as a single bit indicating KCM status or not, is used to indicate that a previous lookup for that data item (specified by the address information in the same entry) has resulted in a cache miss. In other words, it is known that the corresponding data item is not currently stored in the cache 40. Thus, where a lookup procedure carried out with respect to the tag arrays 46 results in a cache miss, this is signalled to the control 52, which causes a corresponding entry in the way tracker 54 to be created or updated with the KCM indicator set. Accordingly when a memory address of a requested data item received by the cache 40 matches a valid entry in the way tracker 54, if the KCM indicator is set, then the way tracker 54 causes the access circuitry 48 to disable access to the data array 42 and the data array 44, since it is known that the requested data item is not stored in either data array and the time and energy expenditure of accessing each data array can be saved. Note that the way tracker is configured not to be able to set the way indication and the KCM marker simultaneously for a valid entry, such that a valid entry in the way tracker can be used either to indicate the storage location of a given data item in the cache or the absence of the given data item from the cache, but not both. Note also that, as also indicated in FIG. 2, the address received by the cache 40 may also be accompanied by further attribute information from a TLB (or μTLB) and these may include information as to whether the requested data item is cacheable or not. Where the requested data item is indicated to be non-cacheable then the control unit 52 is configured to suppress creation of the corresponding entry in the way tracker 54. Note that, as mentioned above, the way tracker may be embodied in effect as a small subset of the tag array(s), and accordingly entries in the way tracker must be invalidated or otherwise appropriately updated when a corresponding entry in the tag array(s) is/are updated.

Figure 3A:
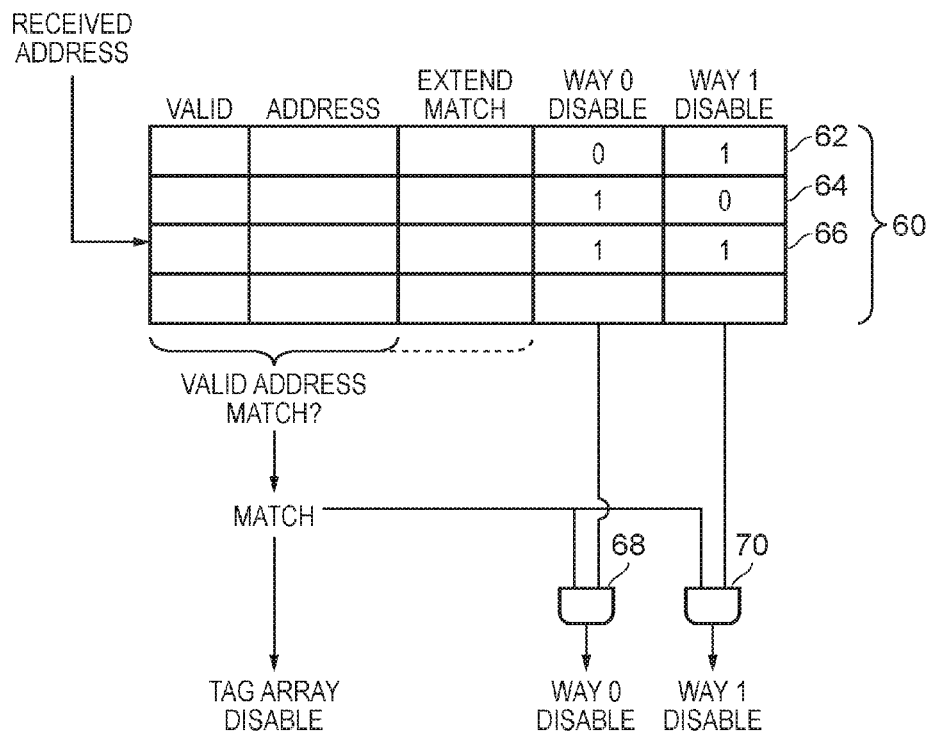
FIG. 3A schematically illustrates a way tracker in one embodiment.

FIG. 3A schematically illustrates the configuration of a way tracker in one embodiment. The entries 60 of this way tracker, like the entries 56 of the way tracker 54 shown in FIG. 2, hold validity and address information for each entry. In addition, each entry 60 holds an "extend match" indicator, and a disable indicator for each way of the cache. In the example embodiment of FIG. 3a, the way tracker is provided in association with a two way cache and accordingly there are two disable indicators for each entry 60. The disable information held for each entry combines the "way" and "KCM" information stored for each entry 56 of the way tracker 54 in FIG. 2. When only one disable bit is set, as in the case of entries 62 and 64, then this indicates that the requested data item is stored in the way which is not disabled. In other words, where a valid address match is found for entry 62, it is then known that this data item is stored in way 0. Similarly if a valid address match is found for entry 64, it is then known that this data item is stored in way 1. Conversely, where both disable bits are set (or more generally all disable bits are set for all ways), this is equivalent to the KCM bit being set in the example embodiment of FIG. 2. In other words if a valid address match is found for entry 66, then it is known that a request for the corresponding data item has previously resulted in a cache miss, and the corresponding data items currently not stored in a cache. Note that in a similar manner to the embodiment of FIG. 2, the way tracker shown in FIG. 3A is configured not to be able to set both (all) way disables to 0 for a valid entry, such that a valid entry in the way tracker can be used either to indicate the storage location of a given data item in the cache or the absence of the given data item from the cache, but not both. Note that in this illustrated embodiment the valid bit could be eliminated from the way tracker and the individual disables could instead be used collectively to indicate whether an entry is valid.

The configuration of the access circuitry in order to make use of the disable bits of each entry of the way tracker is shown in the lower part of FIG. 3A, wherein the disable value for each way is combined by the AND gates 68 and 70 (which take a value indicating if a valid address match has been found as their other input) to form a disable signal for each way. The value indicating if a valid address match has been found is also directly used as the tag array disable signal. Thus, whenever a valid address match is found for an entry in an entry 60 in the way tracker, the lookup in the tag arrays is disabled, whilst the corresponding disable bits stored for that entry determine which of the data arrays are disabled. If only one way does not have its disabled bit set in the entry, then all other data arrays are disabled, and only the non-disabled way is accessed (in which it is known that the requested data item is stored). If both (or more generally all) ways have their disable bits set in the entry of the way tracker, then all data arrays are disabled, since it is known that this data item has previously resulted in a cache miss, and is currently not stored in the cache.

It should be noted that when a request for a particular data item (specified by its memory address) results in a cache miss, this will generally initiate a line fill process by means of which the requested data item is retrieved from either a higher cache level or from the memory, and when the this data item is returned to the cache a corresponding line in the cache (defined by the memory address of this data item) is updated with this new content such that the data item is then cached. One of ordinary skill in the art is also familiar with such a line fill process. The present techniques have been found to be of benefit, in particular with regard to the ability to indicate known cache misses, despite the fact that a cache miss in the cache can result in a line fill process, because it has been found that in the interim period between the first cache miss and the line fill process being completed, there remains the opportunity for applicability of the present techniques by avoiding access to the arrays of the cache. This may for example be the case where a given data item is referenced in a loop of programming code, where the configuration of that loop is such that the processing element carrying out the corresponding instructions will repeatedly request access to that data item in rapid succession, and as such the cache may receive multiple requests for that data item before the line fill process completes.

Figure 3B:
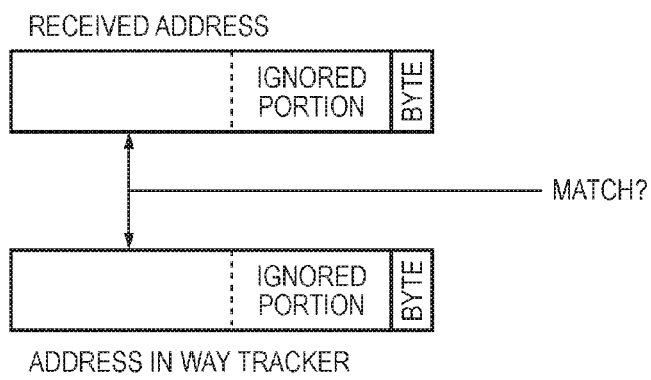
FIG. 3B schematically illustrates determination of a match between an address received by the cache and an address stored in the way tracker in one embodiment.

FIG. 3B schematically illustrates the use of the "extend match" indicator shown in the example of FIG. 3A. When this indicator is set, the way tracker is configured to ignore a portion of the addresses, when determining if a valid address match is found between the received address and the address information stored in an entity of the way tracker. As shown schematically in FIG. 3B, this ignored portion may for example be a least significant portion of the addresses, this having the effect that rather than information stored in an entry of the way tracker being related only to a specific data item (referenced by a single memory address), a single entry in the way tracker can be used to store information relating to a range of (i.e. two or more) memory addresses. The lowest significance bits of the addresses may in any regard be ignored when determining if the match is found, where these lowest significance bits of the address allow byte specification within a given memory address, and thus as shown in FIG. 3B the ignored portion for the purpose of extending the possibility of a match to multiple data items is then a memory address portion above this. Note that the implementation of this wider manner of "matching" will also then extend to the corresponding validity of a group of cache lines tracked in this manner in the way tracker, in that invalidation (for example by an update) of a single line will then cause the wider group of lines to be invalidated.

Figure 4:
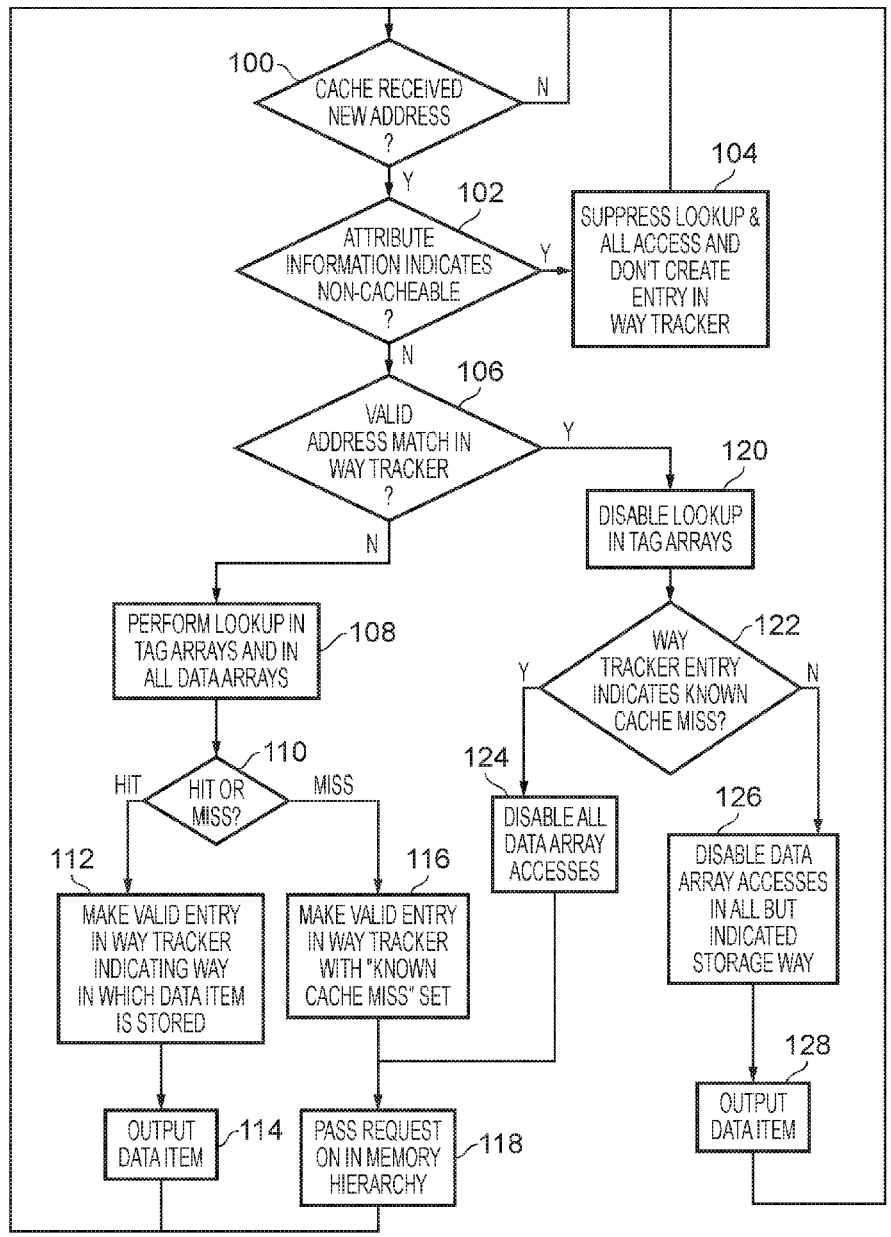
FIG. 4 shows a sequence of steps which are carried out When implementing the method of one embodiment.

FIG. 4 illustrates a sequence of steps which are taken according to the method of one embodiment. The flow can be considered to begin at step 100, where the flow waits until the cache receives a new address. The flow then proceeds to step 102 where it is determined if any attribute information received in association with that new address indicates that the corresponding data item is non-cacheable. If it is, then (at step 104) lookup and all access in the cache are suppressed (i.e. in both tag and data arrays) and the way tracker is prevented from creating a corresponding entry. Otherwise (if the indicated data item is cacheable), then the flow proceeds to step 106 where it is determined if a valid address match is found for an entry in the way tracker. If there is no corresponding match found, then the flow proceeds to step 108 where a lookup in the tag arrays and access to all data arrays of the cache is performed. As a result of the lookup in the tag arrays it is determined at step 110 whether a cache miss or a cache hit has resulted. For a cache hit, the flow proceeds to step 112 where a valid entry in the way tracker is made, indicating the way in which the data item is now known to be stored. At step 114 the corresponding data item is then output and the flow returns to step 100. If however at step 110 a cache miss results then at step 116 a valid entry is made in the way tracker with the "known cache miss" indicator set. Note that in accordance with the above description this could be an explicit indication such as a single "KCM" bit, or alternatively could be the combination of setting disable bits for each way of the cache. The request for this data item is then passed on in the memory hierarchy at step 118 and the flow returns to step 100.

Returning to step 106, if it is found that there is a valid address match in the way tracker for this newly received address, then the flow proceeds to step 120 where lookup in the tag arrays of the cache is disabled. At step 122 it is then determined if the way tracker indicates a known cache miss. If it does, then the flow proceeds via. step 124, where all data array accesses are disabled and the flow then proceeds via 118. If however, the way tracker does not indicate a known cache miss at step 122, then the flow proceeds via step 126 where data array accesses are disabled for all but the indicated storage way, and at step 128 the resulting data item read out from the way in which the data item is stored and output, and the flow returns to step 100.

In overall summary a cache is provided comprising a plurality of ways, each way of the plurality of ways comprising a data array, wherein a data item stored by the cache is stored in the data array of one of the plurality of ways. A way tracker of the cache has a plurality of entries, each entry of the plurality of entries for storing a data item identifier and for storing, in association with the data item identifier, an indication of a selected way of the plurality of ways to indicate that a data item identified by the data item identifier is stored in the selected way. Each entry of the way tracker is further for storing a miss indicator in association with the data item identifier, wherein the miss indicator is set by the cache when a lookup for a data item identified by that data item identifier has resulted in a cache miss. A corresponding method of caching data is also provided.

In the present application, the words "configured to . . . " or "arranged to" are used to mean that an element of an apparatus has a configuration able to carry out the defined operation in this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A cache comprising:
a plurality of ways, each way of the plurality of ways comprising a data array, wherein a data item stored by the cache is stored in the data array of one of the plurality of ways; and
a way tracker comprising a plurality of entries, each entry of the plurality of entries for storing a data item identifier and for storing, in association with the data item identifier, an indication of a selected way of the plurality of ways to indicate that a data item identified by the data item identifier is stored in the selected way, wherein each entry is further for storing a miss indicator in association with the data item identifier, wherein the miss indicator is set by the cache when a lookup for a data item identified by that data item identifier has resulted in a cache miss and indicates that said data item identified by that data item identifier is absent from said cache;
at least one tag array having a plurality of tag entries for storing data item identifiers, the at least one tag array to store a data item identifier in a tag entry of the at least one tag array corresponding to a storage location of a data item in the data array of one of the plurality of ways; and
access circuitry to perform a lookup procedure in the at least one tag array and access the data array of each of the plurality of ways in response to reception of a received data item identifier,
wherein:
the way tracker is responsive to a match between the received data item identifier and the data item identifier in an entry of the way tracker to cause suppression of the lookup procedure by the access circuitry in the at least one tag array,
the indication of the selected way stored in the way tracker comprises a disable indicator for each of the plurality of ways, the access circuitry is responsive to the match between the received data item identifier and the data item identifier in the entry in the way tracker to disable access to the data array of a way of the cache when the disable indicator for that way in the entry of the way tracker is set, and
said cache is configured to store the miss indicator in the way tracker by setting all of the disable indicators for all of the plurality of ways.

2. The cache as claimed in claim 1, wherein the way tracker is responsive to the match between the received data item identifier and the data item identifier in the entry of the way tracker, and when the indication of the selected way is stored in that entry, to cause suppression of the access by the access circuitry to the data array of each of the plurality of ways other than the selected way.

3. The cache as claimed in claim 1, wherein the way tracker is responsive to the match between the received data item identifier and the data item identifier in the entry of the way tracker, and when the miss indicator is stored in association with that data item identifier, to cause suppression of access by the access circuitry to the data array of all of the plurality of ways.

4. The cache as claimed in claim 1, wherein the cache forms part of a memory hierarchy and the cache is a level one cache.

5. The cache as claimed in claim 1, wherein the way tracker is further for receiving storage attribute information associated with a requested data item to which access is sought,
and the way tracker is arranged to suppress creation of an entry in the way tracker with the miss indicator set for the requested data item, when the storage attribute information indicates that the requested data item is non-cacheable.

6. The cache as claimed in claim 5, wherein the storage attribute information is received from a translation lookaside buffer.

7. The cache as claimed in claim 1, wherein the data item identifier is at least a portion of a memory address for the data item.

8. The cache as claimed in claim 1, wherein each entry of the way tracker further comprises a data item identifier extender,
wherein the way tracker is responsive to the data item identifier extender being set to ignore a predetermined identifier portion when determining whether there is a match between a received data item identifier and the data item identifier in an entry in the way tracker.

9. The cache as claimed in claim 8, wherein the predetermined identifier portion comprises a least significant portion of the data item identifier.

10. A method of caching data items comprising:
storing a data item in a data array of a way of a plurality of ways of a cache;
storing a data item identifier in an entry of a way tracker comprising a plurality of entries;
storing, in association with the data item identifier in the entry of the way tracker, an indication of a selected way of the plurality of ways to indicate that a data item identified by the data item identifier is stored in the selected way;
storing a miss indicator in association with each data item identifier stored in the way tracker; and
setting the miss indicator when a lookup for a data item identified by that data item identifier has resulted in a cache miss, wherein said miss indicator indicates that said data item identified by that data item identifier is absent from said cache;

storing a data item identifier in a tag entry of at least one tag array corresponding to a storage location of a data item in the data array of one of the plurality of ways;

performing a lookup procedure in the at least one tag array;

accessing the data array of each of the plurality of ways in response to reception of a received data item identifier;

responsive to a match between the received data item identifier and the data item identifier in an entry of the way tracker, causing suppression of the lookup procedure by the access circuitry in the at least one tag array, wherein the indication of the selected way stored in the way tracker includes a disable indicator for each of the plurality of ways, responsive to the match between the received data item identifier and the data item identifier in the entry in the way tracker, disabling access to the data array of a way of the cache when the disable indicator for that way in the entry of the way tracker is set; and storing the miss indicator in the way tracker by setting all of the disable indicators for all of the plurality of ways.

11. A cache comprising:

means for storing a data item in a data array of a way of a plurality of ways of a cache;

means for storing a data item identifier in an entry of a way tracker comprising a plurality of entries;

means for storing, in association with the data item identifier in the entry of the way tracker, an indication of a selected way of the plurality of ways to indicate that a data item identified by the data item identifier is stored in the selected way;

means for storing a miss indicator in association with each data item identifier stored in the way tracker; and means for setting the miss indicator when a lookup for a data item identified by that data item identifier has resulted in a cache miss, wherein said miss indicator indicates that said data item identified by that data item identifier is absent from said cache;

means for storing a data item identifier in a tag entry of an at least one tag array corresponding to a storage location of a data item in the data array of one of the plurality of ways; and means for performing a lookup procedure in the at least one tag array and for accessing the data array of each of the plurality of ways in response to reception of a received data item identifier, means, responsive to a match between the received data item identifier and the data item identifier in an entry of the way tracker, for suppressing the lookup, wherein the indication of the selected way stored in the way tracker includes a disable indicator for each of the plurality of ways, means, responsive to the match between the received data item identifier and the data item identifier in the entry in the way tracker, for disabling access to the data array of a way of the cache when the disable indicator for that way in the entry of the way tracker is set, and means for storing the miss indicator in the way tracker by setting all of the disable indicators for all of the plurality of ways.

\* \* \* \* \*